United States Patent
Ryan

(10) Patent No.: US 6,263,019 B1
(45) Date of Patent: Jul. 17, 2001

(54) VARIABLE RATE MPEG-2 VIDEO SYNTAX PROCESSOR

(75) Inventor: Robert T. Ryan, Langhorne, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/169,580

(22) Filed: Oct. 9, 1998

(51) Int. Cl.⁷ ........................................... H04B 1/66

(52) U.S. Cl. ........................................... 375/240.02

(58) Field of Search .................... 348/409, 467, 348/717, 384.1, 387.1, 390.1, 425.4, 441; 375/240.12, 340.02, 240.15, 240.02, 240.25; 395/827, 800, 376; 712/200.18, 220; 359/561; 382/303

(56) References Cited

U.S. PATENT DOCUMENTS

| 4,468,688 | 8/1984 | Gabriel et al. . |
| 4,472,732 | 9/1984 | Bennett et al. . |
| 4,908,874 | 3/1990 | Gabriel . |

(List continued on next page.)

OTHER PUBLICATIONS

Winzker et al. "Architecture and Memory Requirements for stand–alone and hierarchical MPEG2 HDTV–Decoders with Synchronous DRAMs" *IEEE* Apr. 30, 1995 pp. 609–612.

Jill Boyce et al. SDTV REceivers with HDTV Decoding Capability Feb. 1995, ACATS Technical Subgroup Meeting, May 1995, Washington DC.

K. Blair Benson et al. Television Engineering Handbook featuring HDTV Systems (Revised Edition), pp. 18.2 to 18.7 1986 McGraw/Hill 18.

Jill Boyce et al. Low–Cost All Format ATV Decoding with Improved Quality, Hitachi America, Ltd, Princeton, N.J., 30th SMPT Advanced Motion Imaging Conference, Paper #11, Feb. 2, 1996.

Jack S. Fuhrer, The All Format Decoder, Hitachi America, Ltd. Jun. 3, 1996.

Recommended Practices for Video Encoding Using the ATSC Digital Televion Standard—Consideraton of Down-sampling Decoders,SMPTE Jun. 6, 1996. Discussion on Recommended Practices for North American ATV Video Coding—Consideration of Downsampling Decoders, Hitachi May 1996.

Discussion on Recommended Practices for North American ATV Video Coding—Consideration of Downsampling Decoders, Hitachi May 1996.

M. Stojancic et al. Architecture & VLSI Implementation of the MPEG–2 MP@ML Video Decoding Process 8012 *SMPTE Journal* 104, Feb. 1995, No. 2.

*Primary Examiner*—Chris Kelley
*Assistant Examiner*—Gims Philippe
(74) *Attorney, Agent, or Firm*—Ratner & Prestia

(57) ABSTRACT

An MPEG-2 video signal decoder includes a syntax parser which is implemented as a state machine. The state machine defines a plurality of states in which discrete parsing operations are performed to decode the MPEG-2 bit-stream. A distinct processing time is established for each state in the state machine. Even if the processing for a particular state is complete before the end of the respective processing time for the state, the transition from the state to the next state does not occur until the end of the time interval. The processing time for each state is set by a microprocessor coupled to the state machine. The processing time for each state may be changed based on image content or to accommodate changes in the circuitry used to implement the state machine. The processing times for the states may also be adjusted to accommodate changes in other processing elements, separate from the state machine but which depend on the state machine for the processing that they perform. One way in which the processing times may be changed is to conform the processing of an image or a sequence of images to a predetermined maximum time interval.

14 Claims, 17 Drawing Sheets

U.S. PATENT DOCUMENTS

| | | |
|---|---|---|
| 5,327,235 | 7/1994 | Richards . |
| 5,489,903 | 2/1996 | Wilson et al. . |
| 5,623,311 * | 4/1997 | Phillips et al. .................. 375/240.25 |
| 5,737,019 | 4/1998 | Kim . |
| 5,812,760 * | 9/1998 | Mendenhall et al. ................ 348/467 |
| 5,812,791 * | 9/1998 | Wasserman et al. ........... 375/240.15 |
| 5,940,016 * | 8/1999 | Lee .................................. 375/240.02 |
| 6,018,776 * | 1/2000 | Wise et al. .......................... 395/827 |

* cited by examiner

VARIABLE RATE MPEG-2 VIDEO SYNTAX PROCESSOR

BACKGROUND OF THE INVENTION

The present invention relates to decoders for processing image data which has been compressed according to a format, MPEG-2, specified by the moving pictures experts group (MPEG) and in particular to a decoder in which different time intervals may be assigned to the decoding of respective segments of the MPEG-2 bit-stream.

Video signal compression performed under the MPEG-2 standard is inherently variable rate. Video data is compressed based on the spatial frequency content of either a sequence of images or on differences in spatial frequency content among the individual images in the sequence.

The syntax for the MPEG-2 standard is set forth in International Standard 13818-2 Recommendation ITU-T H.262 entitled "Generic Coding of Moving Pictures and Associated Audio Information: Video" and available from ISO/IEC, Geneva, Switzerland, which is incorporated herein by reference for its teaching of the MPEG-2 video coding standard. This standard defines several layers of data records which are used to convey both audio and video data. For the sake of simplicity, the decoding of the audio data is not described herein. Encoded data which describes a particular video sequence is represented in several nested layers, the Sequence layer, the Group of Pictures layer, the Picture layer, the Slice layer and the Macroblock layer. Each layer record except for the Macroblock record begins with a start code that identifies the layer. The record includes header data and payload data.

The Sequence layer defines parameters such as picture size and aspect ratio which affect the decoding of a relatively large number of successive images. The Group of Pictures layer defines parameters for a smaller number of images and the Picture layer defines parameters for a single image. Inside of an image, a Slice record defines parameters for a horizontal segment of the image which is composed of multiple Macroblocks.

Thus, the actual image data is in the Macroblock layer. In a typical MPEG-2 bit-stream, there are many more Macroblock and Slice records than Picture, Group of Picture and Sequence records. Accordingly, the headers for the Sequence records, Group of Picture records and Picture records may be decoded using algorithms implemented in software which run on a conventional microprocessor. Slice records and Macroblock records, however, occur more frequently in the bit-stream and are typically decoded using special purpose hardware.

In a typical decoder, the circuitry used to decode the headers of the Slice and Macroblock records is constrained by the circuitry used to decode the payload of the Macroblock records. If any change is made in the Macroblock decoding process, a corresponding change is typically made to the circuitry which processes the Slice and Macroblock headers. If, for example, an existing Macroblock decoder is implemented using a semiconductor process technology having a smaller geometry (e.g. translated from a one micron process to a half-micron process), it may be necessary to redesign the hardware that decodes the Slice and Macroblock headers so that the complete bit-stream is processed properly.

SUMMARY OF THE INVENTION

The present invention is embodied in apparatus for decoding a digitally encoded signal. The apparatus includes a state machine which parses header information in the encoded signal. The state machine defines states corresponding to discrete parsing operations. Each state in the state machine includes a defined processing time for the state. A transition from one state to the next is not implemented until the end of the defined time regardless of whether the actual processing operations performed by the state are complete. The processing time for each state is set by a microprocessor coupled to the state machine. These processing times may be changed based on image content or to accommodate changes in the circuitry used to implement the state machine. The processing times for the state changes may also be adjusted to accommodate changes in other processing elements which are coupled to the state machine.

According to one aspect of the invention, the state machine decodes MPEG-2 encoded image data, parsing the MPEG-2 syntax for the Slice and Macroblock layers.

According to yet another aspect of the invention, a predetermined number of decoding cycles are defined for decoding the image and the microprocessor adjusts the assigned processing times to fit the total processing time for the image into the predetermined number of decoding cycles.

DETAILED DESCRIPTION

Although the present invention is described in terms of a syntax parser for an MPEG-2 data stream, it is contemplated that it may be practiced with a wide variety of digital data protocols where it is desirable to parse the syntax of the protocol as a part of the overall signal processing operation. Thus, in the materials that follow, the MPEG-2 syntax is an example of a protocol for a digital signal.

Figure 1:
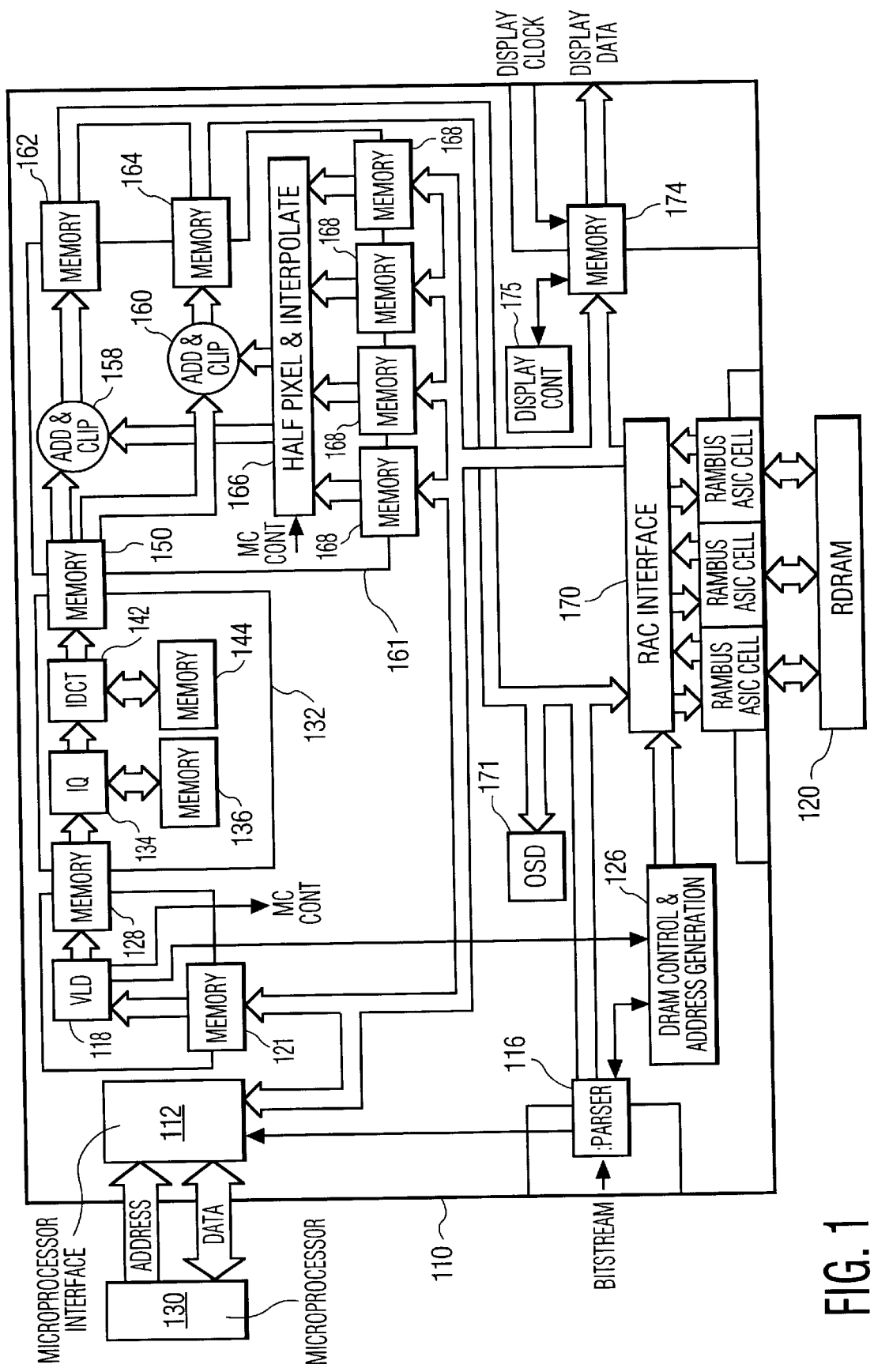
FIG. 1 is a block diagram of an MPEG-2 video decoder which includes an embodiment of the present invention.

FIG. 1 is a block diagram of an exemplary decoder system which embodies the present invention. This system includes three components, a decoding processor 110 a high-bandwidth memory 120 and a control microprocessor 130. The high-bandwidth memory 120 used in the exemplary embodiment of the invention is a RAMBUS memory system which is available from NEC and Toshiba.

Briefly, the decoder shown in FIG. 1 operates as follows. As a first step, the decoder integrated circuit (IC) 110 is initialized by the microprocessor 130 in a particular configuration. If, for example, the decoder is to be used to decode 525P signals, the appropriate control values are applied to the internal circuitry of the decoding processor 110 via the microprocessor interface 112. For the sake of clarity, the control bus between the microprocessor 130 and each of the elements in the IC 110 has been omitted. This bus may be, for example, a conventional I²C bus.

Once the IC 110 has been initialized, the input bit-stream is applied to a parser 116. The parser, described below with reference to FIG. 2, stores the bit-stream in the memory 120. In addition, the parser identifies start codes for the Sequence, Group of Pictures and Picture layers and notifies the microprocessor 130 of the memory locations at which these start codes are stored. In the exemplary decoder shown in FIG. 1, the microprocessor decodes the header information for these layers.

The DRAM control and address generator 126, controls the RAC interface 170 to store the bit-stream data into the memory 120. In the exemplary embodiment of the invention, a portion of the memory 120 is reserved for use as a buffer to hold the input bit-stream. This buffer area corresponds to the VBV buffer which is specified in the MPEG-2 standard.

After the bit-stream data is written into the VBV buffer area of memory 120, it is read from the memory 120 and stored in the buffer memory 121, also under control of the DRAM control and address generation circuitry 126. The memory 121 is a FIFO memory which is filled in bursts from the memory 120 and emptied by the variable length decoder (VLD) 118 as dictated by the bit-stream syntax.

The VLD 118 parses the Slice and Macroblock layers of the bit-stream to generate blocks of quantized discrete cosine transform coefficient values. These blocks of values are applied a FIFO memory 128. This FIFO memory buffers the data between the VLD 118 on the one hand and the Macroblock decoding circuitry 132 on the other hand. This memory may also perform the inverse scan function defined in the MPEG-2 standard. The circuitry 132 includes an inverse quantizer 134 which converts the quantized coefficient values into a uniform format and an inverse discrete cosine (IDCT) processor converts the frequency domain coefficients into spatial domain pixel values or differential pixel values. The inverse quantizer 134 and IDCT processor 142 include respective memories 136 and 144 to aid in the processing operations. The output data provided by the circuitry 132 are blocks of pixel values or differential pixel values.

Where the values in the blocks are differential pixel values, they are combined with values from previously decoded image frames by a motion compensation processor 161 which includes add and clip circuitry 158 and 160. These circuits, in turn, obtain the image data from the previously decoded frames, which are provided by the half pixel and interpolation circuitry 166. The interpolation circuitry 166 obtains the image picture elements (pixels) from the previously decoded frames using buffer memories 168. Data values for these memories are provided from the memory 120 by the DRAM control and address generation circuitry 126.

The decoded image data produced by the motion compensation processor 161 is stored into buffer memories 162 and 164. From the buffer memories 162 and 164 the decoded image data is stored into the memory 120 for display or for use as reference frame data in decoding motion compensated encoded data from later received image fields or frames. Data to be displayed is stored into the memory 120 in block format and transferred, in raster-scan format, to a memory 174 to be provided to a display device (not shown) under control of a display processor 175.

An on-screen display (OSD) processor 171 is also coupled to provide data to, and to receive data from the memory 120 via the DRAM control and address generator 126 and RAC interface 170. In the exemplary embodiment of the invention, the OSD processor 171 generates user menus and close-caption text which overlays the displayed image.

As described above, the VLD processor 118 decodes the Slice and Macroblock information in the bit stream and passes the decoded, quantized coefficient values to the Macroblock decoding circuitry 132. The processing performed by the circuitry 132 includes the computation of an inverse discrete cosign transform for individual blocks of pixel values. For high definition images having frame rates of 30 frames per second, it is desirable for this operation to be performed as quickly as possible due to the large number of blocks in a high definition video image frame. If only standard definition images (i.e. MP@ML) are to be decoded, this operation is not as critical. Thus, depending on the type of images which are to be processed, it may be desirable to implement the Macroblock decoder using a very fast process technology (e.g. .2 micron) or using a slower process technology (i.e. 1 micron).

Changing the process technology in which the Macroblock decoder is implemented changes the speed at which Macroblocks are processed and thus affects the synchronization of the entire system. If the VLD processor 118 is implemented in the same technology as the Macroblock decoder 132, the processing steps performed by these two decoders may not change in proportion. Thus, for a given Macroblock decoder process implementation, it may be desirable to totally redesign the VLD processor 118.

Alternatively and according to the subject invention, the VLD processor 118 may be designed as a state machine in which the time required to transition from one state to another may be programmed. Thus, if a change in process technology causes the VLD to process the bit stream more quickly than can be accommodated by the Macroblock decoder 132, the VLD may be reprogrammed to increase the time required for selected state transitions in order to synchronize the processing of the VLD to that of the Macroblock decoder.

Figure 2:
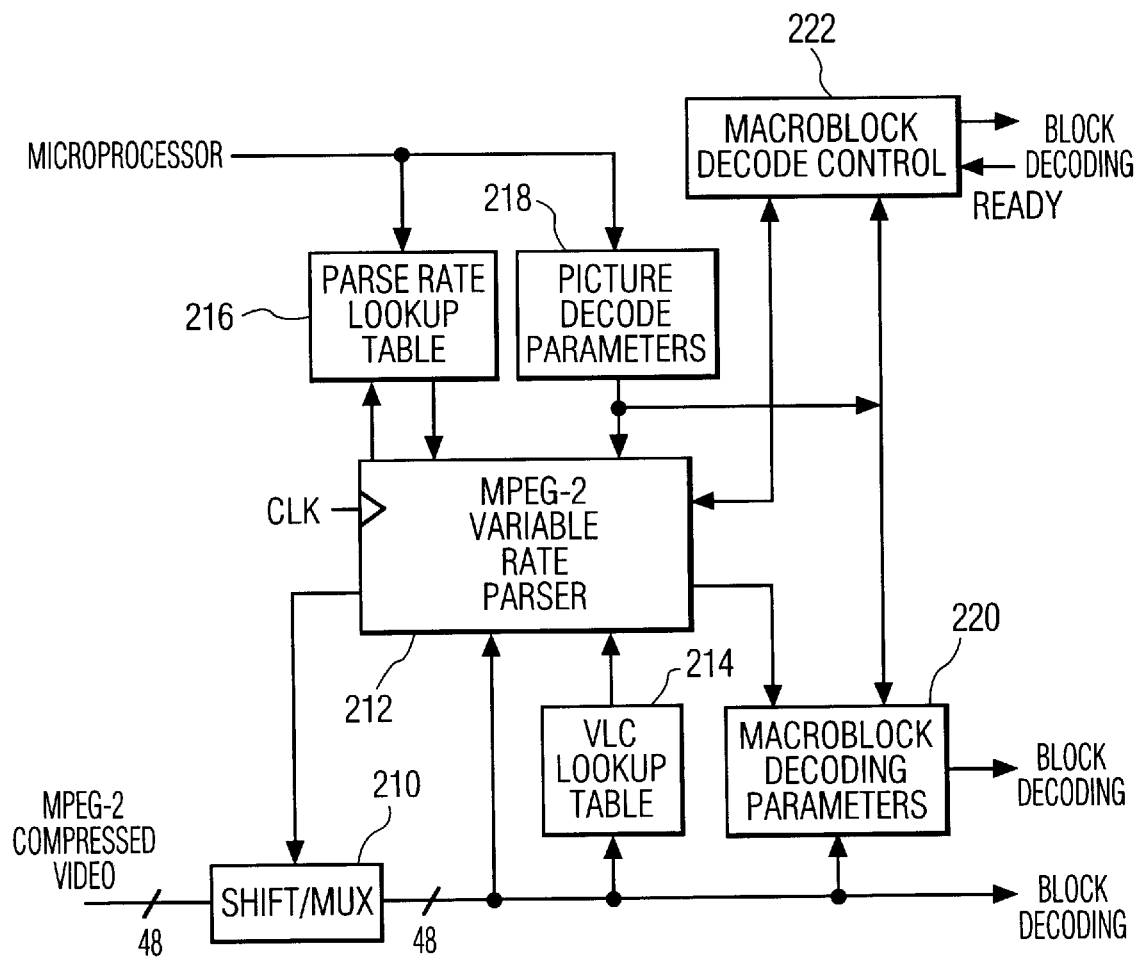
FIG. 2 is a block diagram of a VLD decoder suitable for use in the video decoder shown in FIG. 1.

FIG. 2 is a block diagram of a variable length decoder 118 according to the present invention. As shown in FIG. 2, the compressed MPEG 2 video data stream is received from the memory 121 by the shift multiplexer 210. The shift multiplexer 210 applies 48 bits of the bit stream to the variable rate processor 212, the VLC lookup table 214 and to the Macroblock parameter decoder 220. The VLC lookup table 214 holds several values that are retrieved from the Macroblock header. These values are used by the parser 212 to convert the variable length coded DCT coefficient values into fixed length coefficient values which are applied to the MPEG 2 variable rate parser 212. The values held by the VLC lookup table include the Macroblock Addressing values, Macroblock type, Macroblock pattern and the Macroblock motion vectors. As the header information for the various levels of records is not variable length coded this information may be extracted directly from the bit-stream by the variable rate parser. The decoder 212 is also coupled to a parse rate lookup table 216 which, as described below with reference to FIGS. 3 through 22, defines parse times for each of a set of syntactical items defined in the overall MPEG-2 syntax. Each of these syntactical items is parsed by a respective state of the state machine implementation of the parser 212 as described below with reference to FIG. 3. The parse rate lookup table is loaded by the microprocessor 130 and its values are read by the variable rate parser 212.

As described above, the VLD 18 parses only the Slice and Macroblock layers of the MPEG 2 syntax. The Sequence, Group of Picture, and Picture layers of the syntax are parsed by the microprocessor 130. Parameter values relevant to the decoding of Slice and Macroblock records are provided by the microprocessor 130 via the picture decode parameters block 218.

The variable rate parser 212 decodes the Macroblocks into individual blocks of DCT coefficient values. These coefficients values and other header items decoded from the Macroblock layers are provided to the Macroblock parameter decoder 220. This decoder provides the DCT coefficients and motion vectors to the Macroblock decoding circuitry 132. Control circuitry 222 is coupled to the variable rate parser 212 to provide blocks of DCT coefficients to the Macroblock decoder 132 when the decoder 132 asserts the signal READY.

Figure 3:
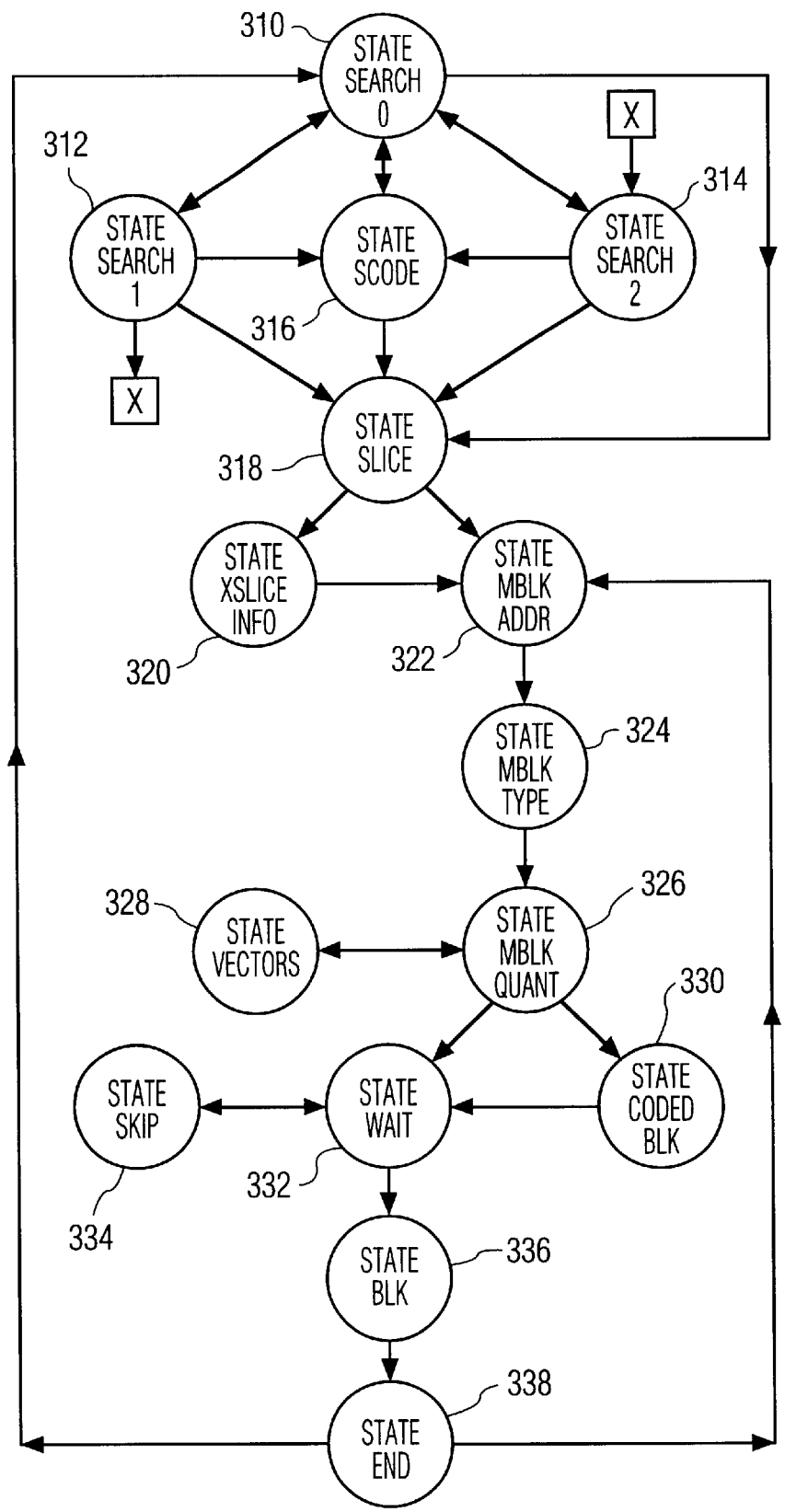
FIG. 3 is a state diagram for a state machine which includes an embodiment of the invention.

FIG. 3 is a state diagram of a state machine implementation of the VLD processor 118 shown in FIG. 1. This state machine divides the decoding of Slice and Macroblock records into 15 states. Each of these states is defined in detail below with reference to FIGS. 4 through 19.

The 15 defined states include four states, Search0, 310; Search1, 312; Search2, 314; and Start Code, 316. These states which locate start codes and, in particular, Slice start codes in the bit stream. When a Slice start code is identified, the state machine transitions to the Slice state 318.

From the Slice state 318, the state machine transitions to the Xslice Info state 320 and to the Macroblock Address state 322. State 322 begins the decoding of the Macroblock header portion of the bit stream. After the Macroblock address is calculated at step 322, the state machine transitions to state 324 to determine the Macroblock type from the Macroblock header information contained in the bit stream. After the Macroblock type has been determined in state 324, the state machine transition state 326 to retrieve the Macroblock quantization information and, through state 328, any motion vectors which may exist for the Macroblock. If, in state 326 it is determined that the Macroblock is a coded Macroblock, control transitions to state 330 to process the coded Macroblock. Otherwise, after state 326 and after state 330, control transitions to state 332 to wait until the Macroblock decoder 132 is ready to accept the next block of coefficient values.

A Macroblock may be skipped in two ways. First, in the MPEG-2 syntax, some Macroblocks are marked as skipped Macroblocks in the MPEG-2 syntax. These Macroblock records have header information but no coefficient values. The second way in which a Macroblock may be skipped is if the Macroblock decoder has encountered an error in the bit-stream and is skipping the remainder of the blocks in the slice, the Skip state 334 satisfies the Wait state 332 in either of these instances. When the Wait state has been satisfied and the Macroblock decoder 132 accepts the next block of coefficient values, the state machine transitions to state 336 to provide the coefficient values to the Macroblock decoder 132. After providing these values, the state machine transitions to state 338 to determine if further Macroblocks exist in this Slice, in which case the state machine transitions to state 322, or whether a new Slice is to be processed in which case the state machine transitions to state 310.

As described above, the microprocessor assigns a completion time at which any state transition in the state diagram shall occur after the entry into the state. In this implementation, any processing which takes place in a state occurs in this time interval. The actual state transition does not occur until the number of system clock periods indicated by that time interval have elapsed. This implementation allows the VLD processor to be changed adaptively to process shorter or longer item syntaxes rather than being designed to perform the worst case syntax processing for each syntactical item.

For example, under the MPEG standard, a Macroblock may be defined as a dual-prime Macroblock in which case it may include four motion vectors. An intra-frame coded Macroblock on the other hand has no motion vectors. When the state machine is decoding an intra-frame coded Macroblock, the vector state may be allocated a small or zero processing time. When the system is decoding a dual-prime Macroblock, however, twice the normal state processing time may be allocated for the vector state to allow the extra motion vectors to be properly decoded.

Figure 4:
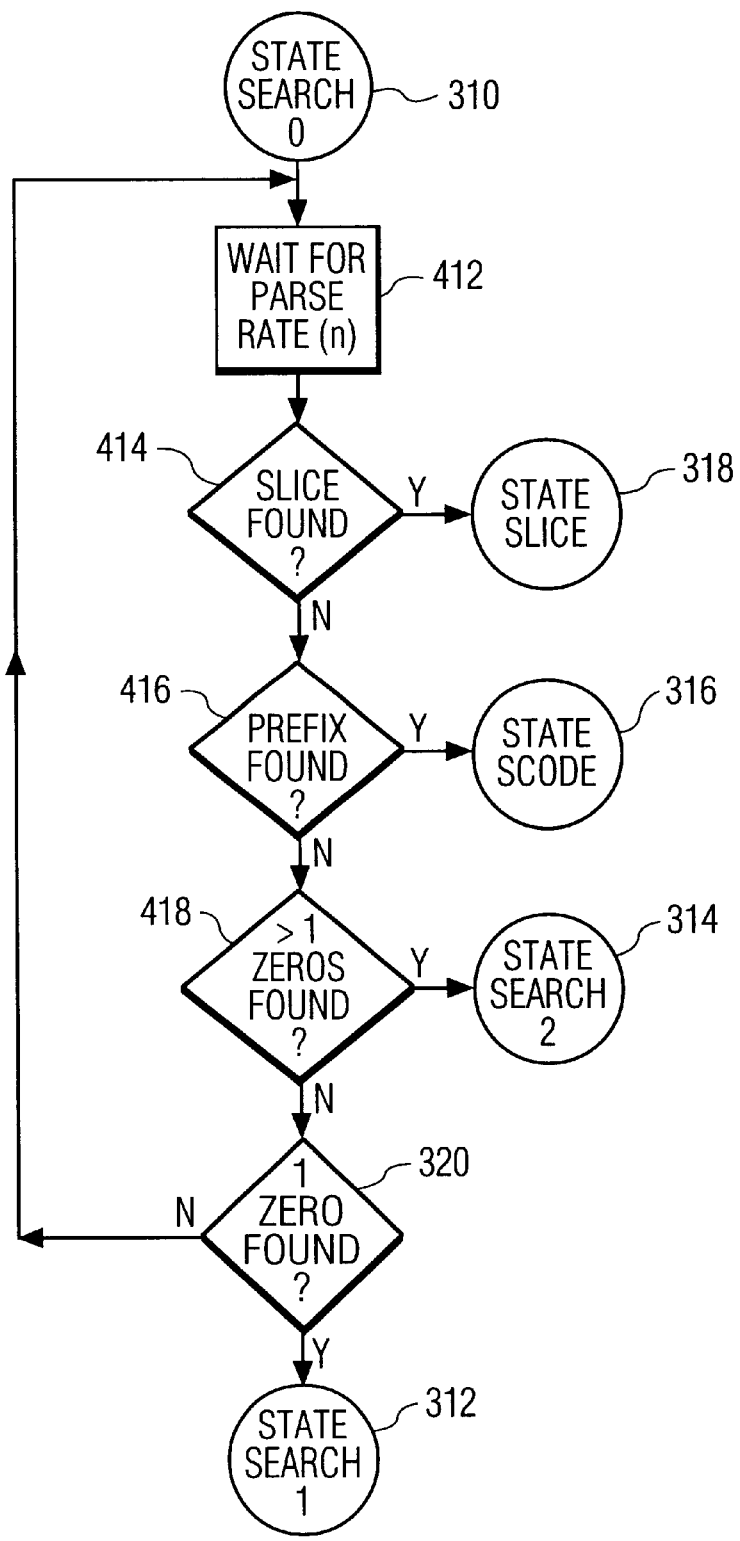
FIG. 4 is a flow-chart diagram which is useful for describing processing performed by the state machine while it is in the Search0 state shown in FIG. 3.

FIG. 4 is a flow chart diagram which describes the operation of the state machine in state Search0 310. The first step in this process is step 412, in which the variable rate parser 212 waits until the processing time for the previous state has elapsed and accesses the parse rate lookup table 216 for the state Search0. The value returned from table 216 defines a number of system clock pulses which will elapse before there can be a transition from state Search0 to another state of the state machine. The first step in the Search0 processing is step 414, where the input bit stream is analyzed to determine if the next bytes in the bit stream represent a Slice start code value. The start code values of interest to the subject application are the Slice start codes which may have values of 0x01 through 0xAF depending on the vertical position of the Slice in the image frame.

If a Slice start code value is found at step 414, then the next transition of the state machine is to the Slice state 318, described below with reference to FIG. 8. If a Slice start code value is not found at step 414, the next step in the Search0 process, step 416, determines if the next bytes in the bit stream correspond to a start code prefix. As defined in the MPEG-2 standard, a start code prefix is a string of 23 zero-valued bits followed by a single one-valued bit. To determine if a start code prefix has been found in the bit-stream, the state machine counts the number of zeros in any group of zeros which are separately parsed by the parser. Thus, in determining if a start code prefix has been found in the bit-stream, step 416 determines if the next byte has a value of 1 and if at least 2 other zero-valued bytes were counted immediately before this one-valued byte. If these conditions are satisfied then a start-code prefix is found at step 416 and the next state for the state machine is the Start Code state 316. Otherwise, control transfers to step 418.

At step 418, the Search0 process determines if the next bytes in the bit stream represent more than one zero valued byte. If so, these zero-valued bytes are removed from the bit-stream, the current count of zero-valued bytes is stored into a local variable (not shown) of the Search0 state, and the Search2 state 314 is marked as the next state for the state machine. Otherwise, step 320 is executed which determines the next byte in the bit stream is a zero. If so, this zero-valued byte is removed from the bit-stream, the current zero count value is incremented by one and the next state for the state machine is state Search1. If the bit stream does not contain just a single zero-valued byte, the next byte in the bit-stream must be non-zero. Accordingly, this byte is removed from the bit-stream and control is transferred to step 412. Essentially this is a transition from state Search0 back upon itself. At step 412, the Search0 state 310 waits until the previous allotted time for state Search0 has elapsed and fetches the new allotted time for state Search0.

Figure 5:
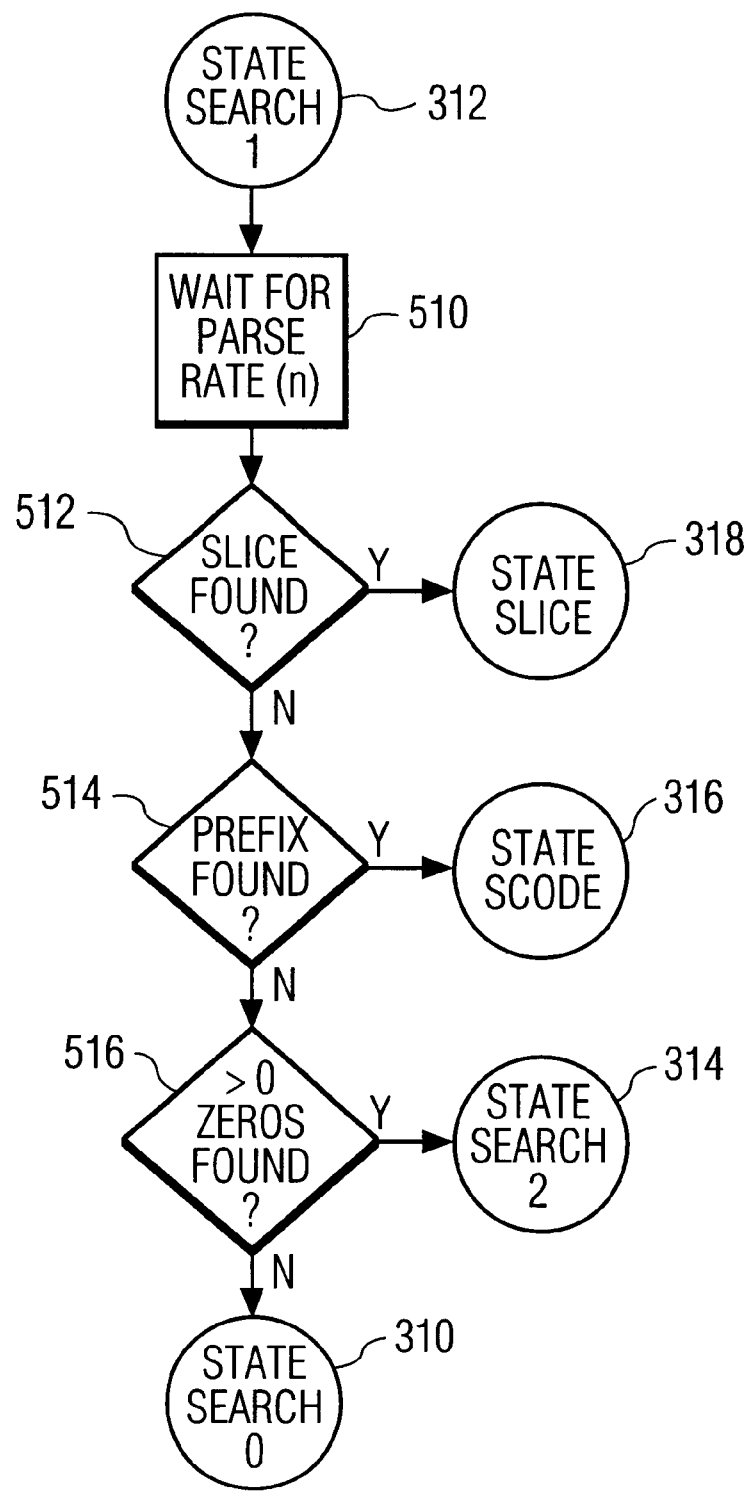
FIG. 5 is a flow-chart diagram which is useful for describing processing performed by the state machine while it is in the Search1 state shown in FIG. 3.

FIG. 5 is a flow chart diagram of state Search1. The processing for the Search1 state 312 begins with step 510 which waits until the allotted time for the previous state has elapsed and fetches the current time for state Search1 from the parse rate lookup table 216 (shown in FIG. 2). After fetching the allotted time for state Search1, step 512 is executed to determine if the next bytes in the bit stream correspond to a Slice start code value. If so, control transitions to the Slice state 318. If a Slice start code is not found at step 512, state 514 is executed to determine if the next bytes in the bit stream correspond to a start code prefix. If a prefix is found at step 514, the state machine transitions to the Start Code state 316. If a start code prefix is not found at step 514, step 516 determines if the next byte or bytes in the bit stream have a value of zero. If so, the next state transition for the state machine is to the Search2 state 314. If, instead, the next byte in the bit stream is not the next state transition for the state machine is back to the Search0 state 310.

Figure 6:
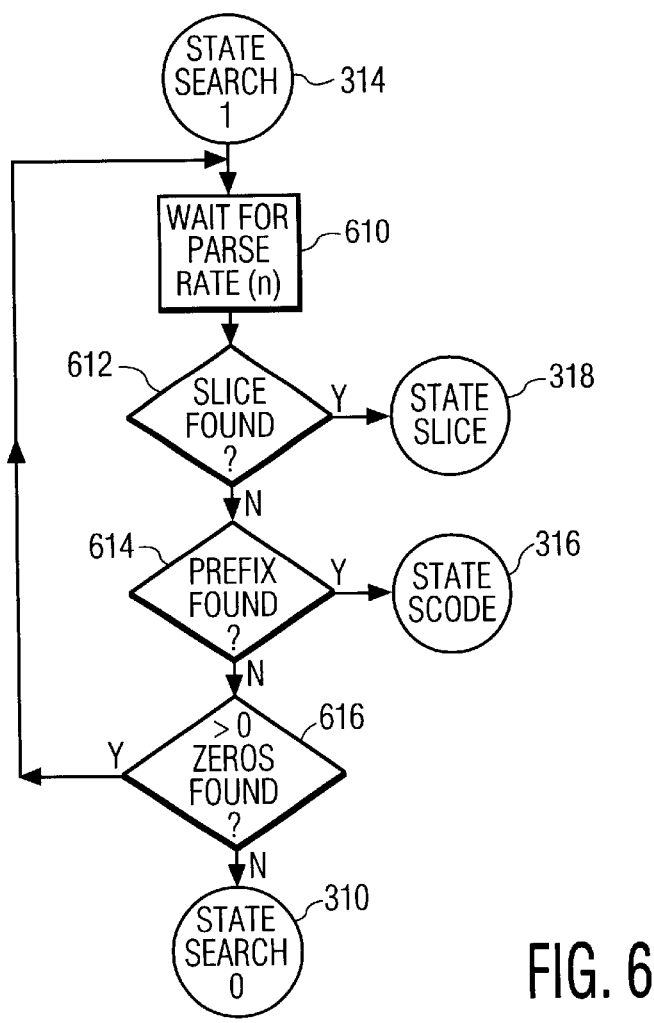
FIG. 6 is a flow-chart diagram which is useful for describing processing performed by the state machine while it is in the Search2 state shown in FIG. 3.

FIG. 6 is a flow chart diagram which illustrates processing performed in the Search2 state 314. This state processes the zero valued stuffing bits which are inserted before certain start codes in the MPEG bit stream. The Search2 state 314 begins at step 610 in which the state machine waits until the time allotted for the previous state has elapsed and then fetches the current allotted time for the Search2 state from the parse lookup table 216. After step 610, control transfers to step 612 to determine if the next bytes in the bit stream correspond to a Slice. If so, the next state transition for the state machine is to the Slice state 318. Otherwise, step 614 is executed in which the Search2 process determines if the next bytes in the bit stream correspond to a start code prefix. If a start code prefix is encountered at step 614, the next state for the state machine is the Start Code state 316. Otherwise, control transfers to step 616 of the Search2 process. Step 616 determines if the next bytes in the bit stream are zeros. If so, these zero-valued bytes are removed from the bit stream and control transfers to step 610. This is essentially a transition from state Search2 back upon itself. If the bit-stream includes a long sequence of stuffing bits, state Search2 will continually loop back upon itself until all of the stuffing bits have been removed from the bit-stream. If, at step 616, the next byte in the bit stream is not a 0, the next state transition for the state machine is to the Search0 state 310, described above with reference to FIG. 4.

Figure 7:
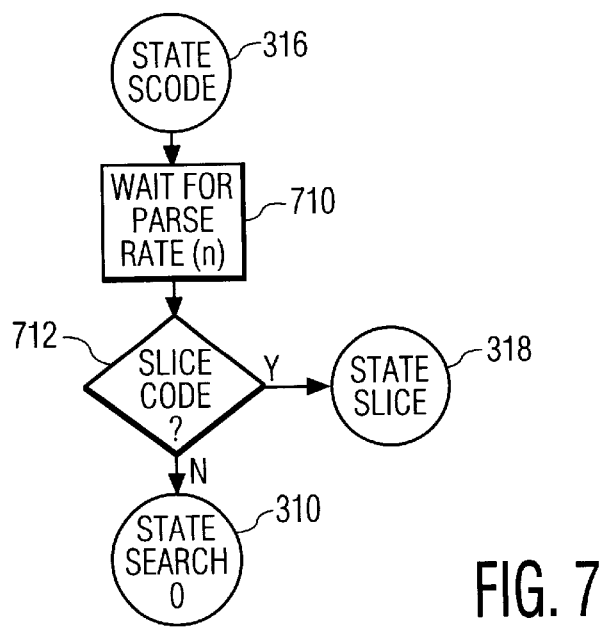
FIG. 7 is a flow-chart diagram which is useful for describing processing performed by the state machine while it is in the Start Code state shown in FIG. 3.

FIG. 7 is a flow chart diagram which illustrates the operation of a state machine in the Start Code state 316. Step 710 of this process waits for the previous state to complete and fetches the amount of time currently allocated to the Start Code state from the lookup table 216. As described above, the Start Code state is entered if a start code prefix is found in the bit stream. At step 712, the start code prefix is removed from the bit stream and the next bytes of the bit stream are examined to determine if they correspond to a Slice start code value. If so, the next state transition for the state machine is to the Slice state 318. Otherwise, the start code value is not a Slice start code value and the next state for the state machine is the Search0 state 310.

Figure 8:
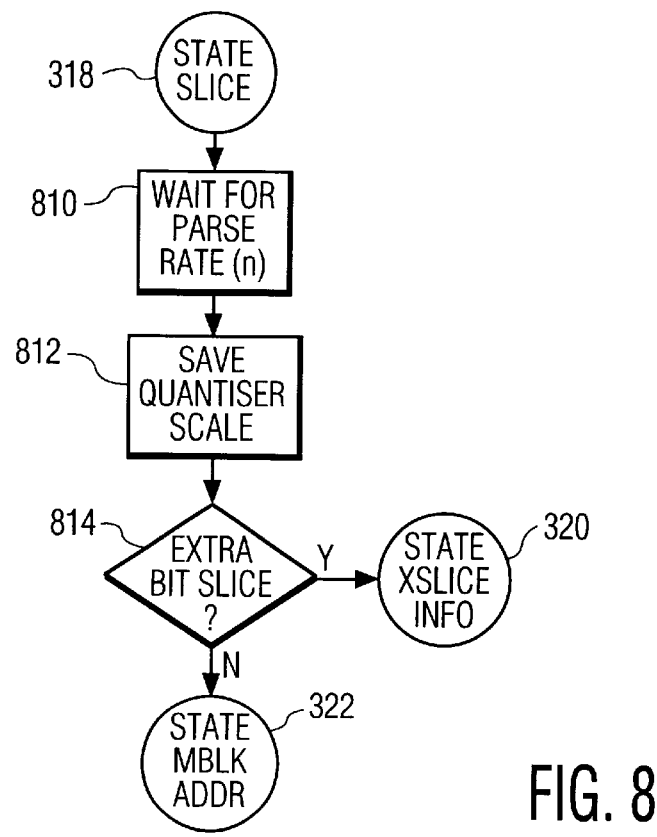
FIG. 8 is a flow-chart diagram which is useful for describing processing performed by the state machine while it is in the Slice state shown in FIG. 3.

FIG. 8 is a flow chart diagram which illustrates the operation of the state machine in the Slice state 318. At step 810, the process waits for the processing of the previous state to complete, and fetches the current time allotted for the Slice processing from the parse rate lookup table 216. As shown in Table 1, the syntax diagram for the Slice header from the above referenced MPEG-2 specification, the first item in the Slice header is the quantizer scale information for the Slice.

TABLE 1

```
Macroblock
macroblock( ) {
    while (nextbits( ) = '0000 0001 000')
        macroblock_escape
    macroblock_address_increment
    macroblock_modes( )
    if (macroblock_quant)
        quantiser_scale_code
    if (macroblock_motion_forward ||
        (macroblock_intra&&concealment_motion_vectors)
        motion_vectors(0)
    if (macroblock_motion_backward)
        motion_vectors(1)
    if(macroblock_intra&&concealment_motion_vectors))
        marker_bit
    if (macroblock_pattern)
        coded_block_pattern( )
    for(i=0;i<block_count;i++){
        block(i)
    }
}
```

The terms used in the Macroblock syntax are defined in the above referenced MPEG-2 Video specification.

At step 812, this information is retrieved from the bit stream and stored. At step 814, the next bit in the bit stream is examined to determine if extra information is defined for this Slice. If so, the Xslice Info state 320 is the next state for the state machine. Otherwise, the next information following the extra bit is the beginning of a Macroblock. Processing of the Macroblock begins with a transition of a state machine to state Macroblock Address 322.

Figure 9:
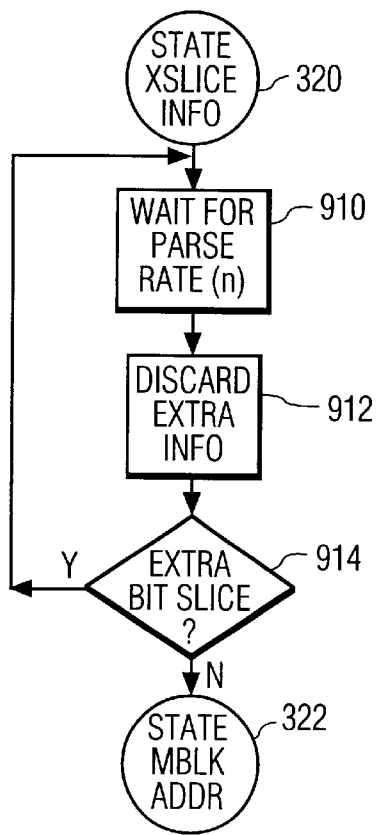
FIG. 9 is a flow-chart diagram which is useful for describing processing performed by the state machine while it is in the Xslice Info state shown in FIG. 3.

FIG. 9 is a flow chart diagram which illustrates the operation of the state machine in state Xslice Info 320. After waiting for the prior state to complete and fetching the currently allotted time for the Xslice Info state at step 910, step 912 is invoked to discard the extra information from the bit stream. At step 914, the process checks the byte immediately following the removed extra information record to determine if yet another extra information record is included in the Slice header. If so, control transfers to step 910, essentially a transition from the Xslice Info state 320 to itself, to remove the next extra information record. Once all of the extra information records have been discarded from the Slice header, step 914 causes the next state transition of the state machine to be state Macroblock Address 322.

Figure 10:
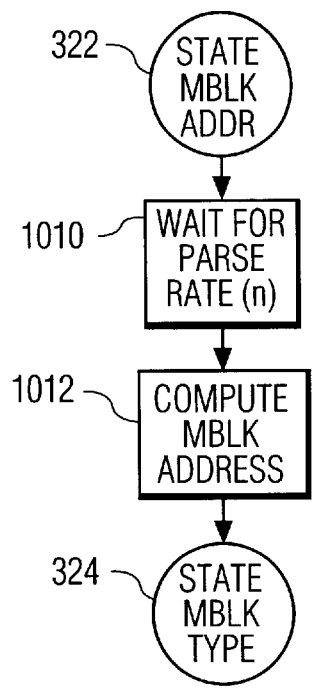
FIG. 10 is a flow-chart diagram which is useful for describing processing performed by the state machine while it is in the Macroblock Address state shown in FIG. 3.

FIG. 10 is a flow chart diagram which illustrates the process performed by state Macroblock Address 322. After waiting for the previous state to complete and obtaining the currently allotted number of clock cycles for state Macroblock Address from the parse rate lookup table 216, the process shown in FIG. 10 computes the Macroblock address at step 1012. In the MPEG standard, the start code for a Slice is coded to indicate the vertical position of the Slice on the reproduced image. In addition, as shown in Table 3, the MPEG-2 syntax for the Macroblock, the first item in the Macroblock record is an address increment value, which defines the address of the Macroblock in the Slice. Step 1012 retrieves the start code value and the address increment value from the bit stream and, using the current Slice start code value, calculates the address for the Macroblock in the image. After step 1012, the state transition for the state machine is to state Macroblock Type 324.

Figure 11:
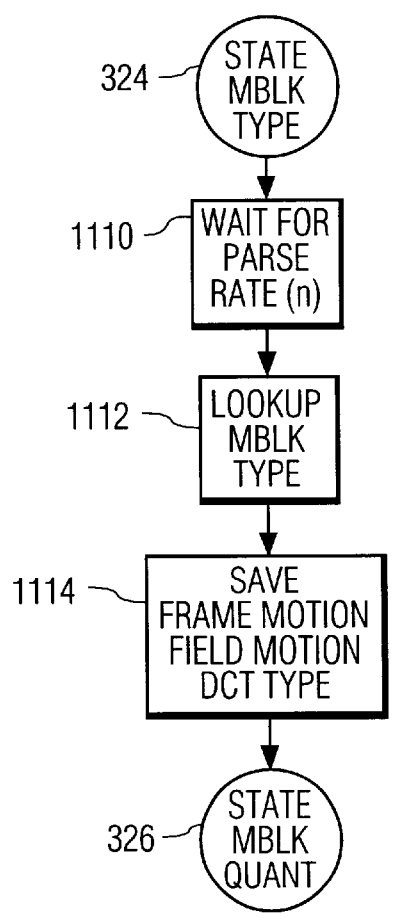
FIG. 11 is a flow-chart diagram which is useful for describing processing performed by the state machine while it is in the Macroblock Type state shown in FIG. 3.

FIG. 11 is a flow chart diagram which illustrates the processing performed by a state Macroblock Type 324. After step 1110 in which the state machine waits for the prior state to complete and fetches the current allotted time for the state Macroblock Type state, step 1112 is executed which fetches the Macroblock Type field from the Macroblock header.

The Macroblock block type determines whether the motion compensation processing performed by the Macroblock is frame based or field based and whether the DCT coding of the Macroblock is frame based or field based. At step 1114, these values are stored by the state machine. After step 1114, the next state for the state machine is the Macroblock Quantizer state 326.

Figure 12:
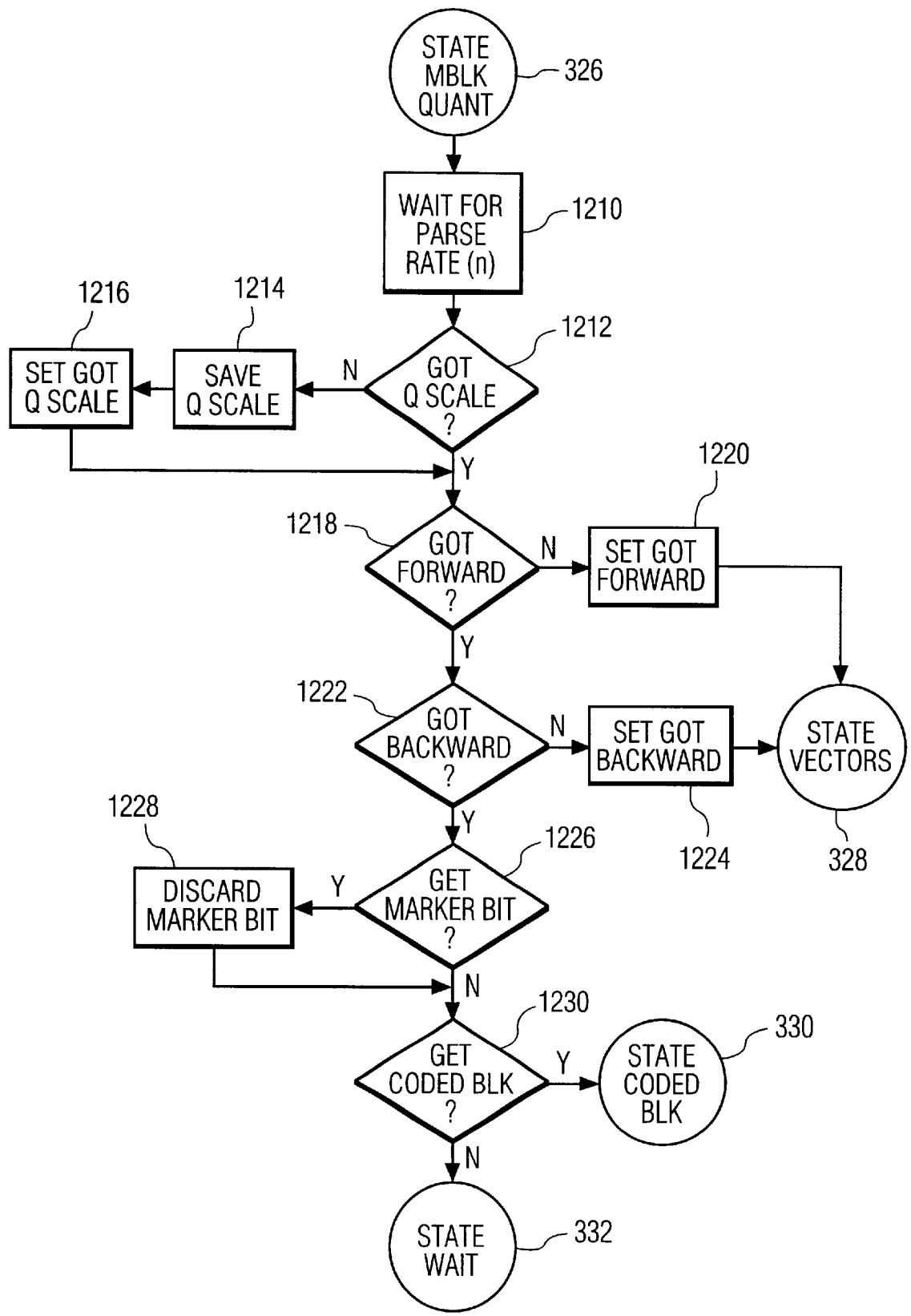
FIG. 12 is a flow-chart diagram which is useful for describing processing performed by the state machine while it is in the Macroblock Quantizer state shown in FIG. 3.

FIG. 12 is flow chart diagram showing the processing performed during the Macroblock Quantizer state 326. As described below, this state may be entered several times for each Macroblock as it contains the state transition to the Vector state which extracts the motion vector information from the Macroblock. To ensure that the Macroblock syntax is interpreted properly during the invocations of the state 326 after the first invocation, several Boolean variables are defined: Q SCALE, GOT FORWARD, and GOT BACKWARD. The use of these Boolean variables is described below.

At step 1210, the state machine waits for the previous state to complete and fetches the currently allotted time value for the Macroblock Quantizer state. At step 1212, the state machine tests the Boolean state variable Q SCALE to determine if the quantizer scale code for this Macroblock has been obtained. If not, then at step 1214, the Macroblock Quantizer process fetches the next value from the bit stream as the quantizer scale code for the Macroblock and sets the Boolean variable GOT Q SCALE at step 1216. Next, at step 1218 the Macroblock Quantizer process tests a Boolean variable GOT FORWARD to determine if the forward motion vectors have been obtained for this Macroblock. If not, then at step 1220, the Boolean variable GOT FORWARD is set and the next state for the state machine is set to the Vectors state 328. If, however, at step 1218, the variable GOT FORWARD was set then control transfers to step control 1222 to test the Boolean variable GOT BACKWARD. This Boolean variable is set if the backward motion vectors have been obtained for the Macroblock. If they have not, control transfers to step 1224 at which the Boolean variable GOT BACKWARD is set and the next state of the state machine is set to the Vectors state 328. If at step 1222 the Boolean variable GOT BACKWARD was set, step 1226 is executed to determine if a marker bit exists in the Macroblock header. If so, step 1228 is executed to discard the marker bit from the bit stream and control is transferred to step 1230. At step 1230, which is also executed after step 1226 if the Macroblock header does not contain a marker bit, the state Macroblock Quantizer determines if the Macroblock includes a coded block pattern. If so, the next transition for the state machine is to the Coded Block state 330. Otherwise, the blocks of the Macroblock are ready to go to the Macroblock processor 132 (shown in FIG. 1) and the next state for the state machine is the Wait state 332.

Figure 13:
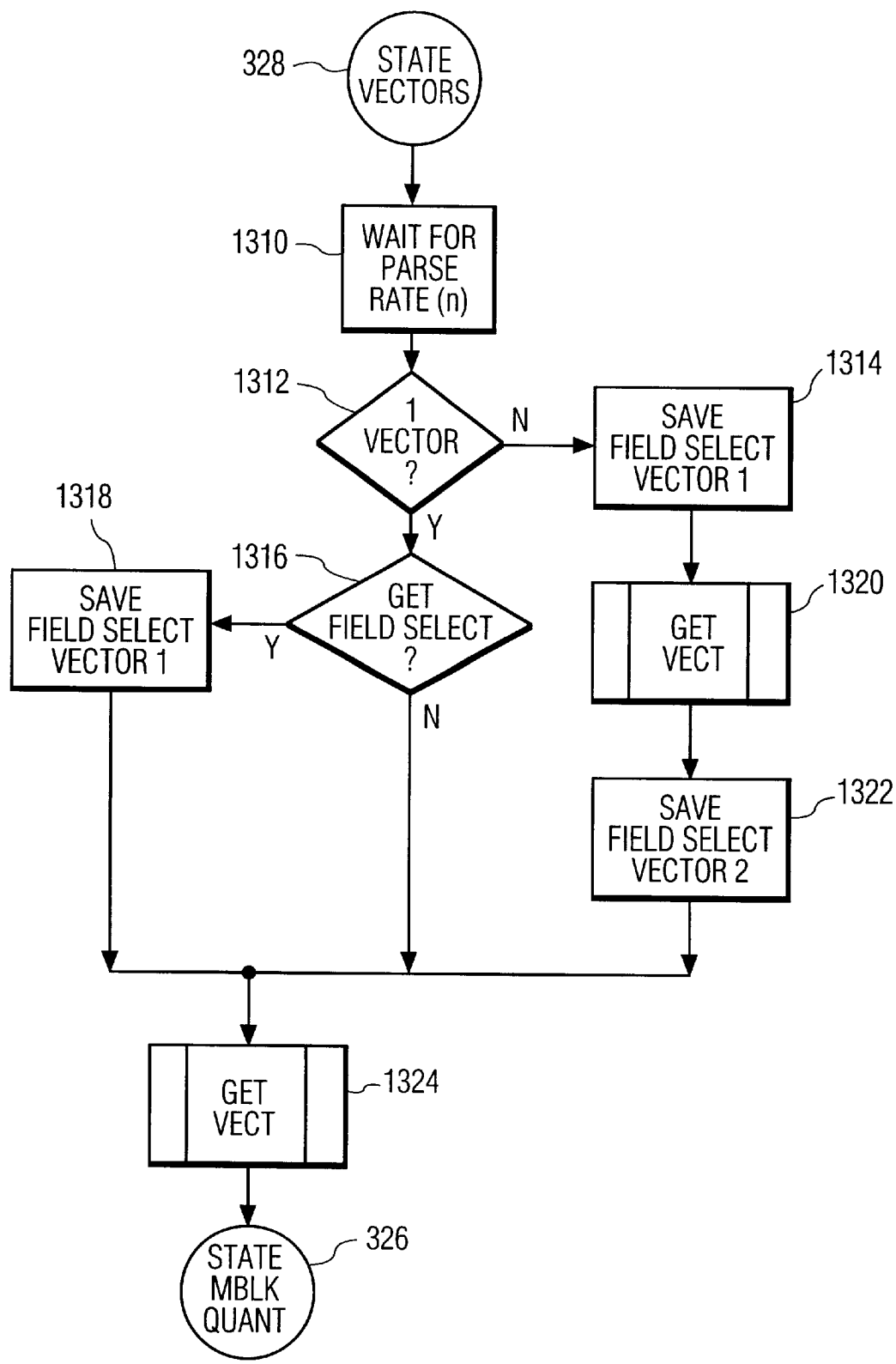
FIG. 13 is a flow-chart diagram which is useful for describing processing performed by the state machine while it is in the vectors state shown in FIG. 3.
Figure 14:
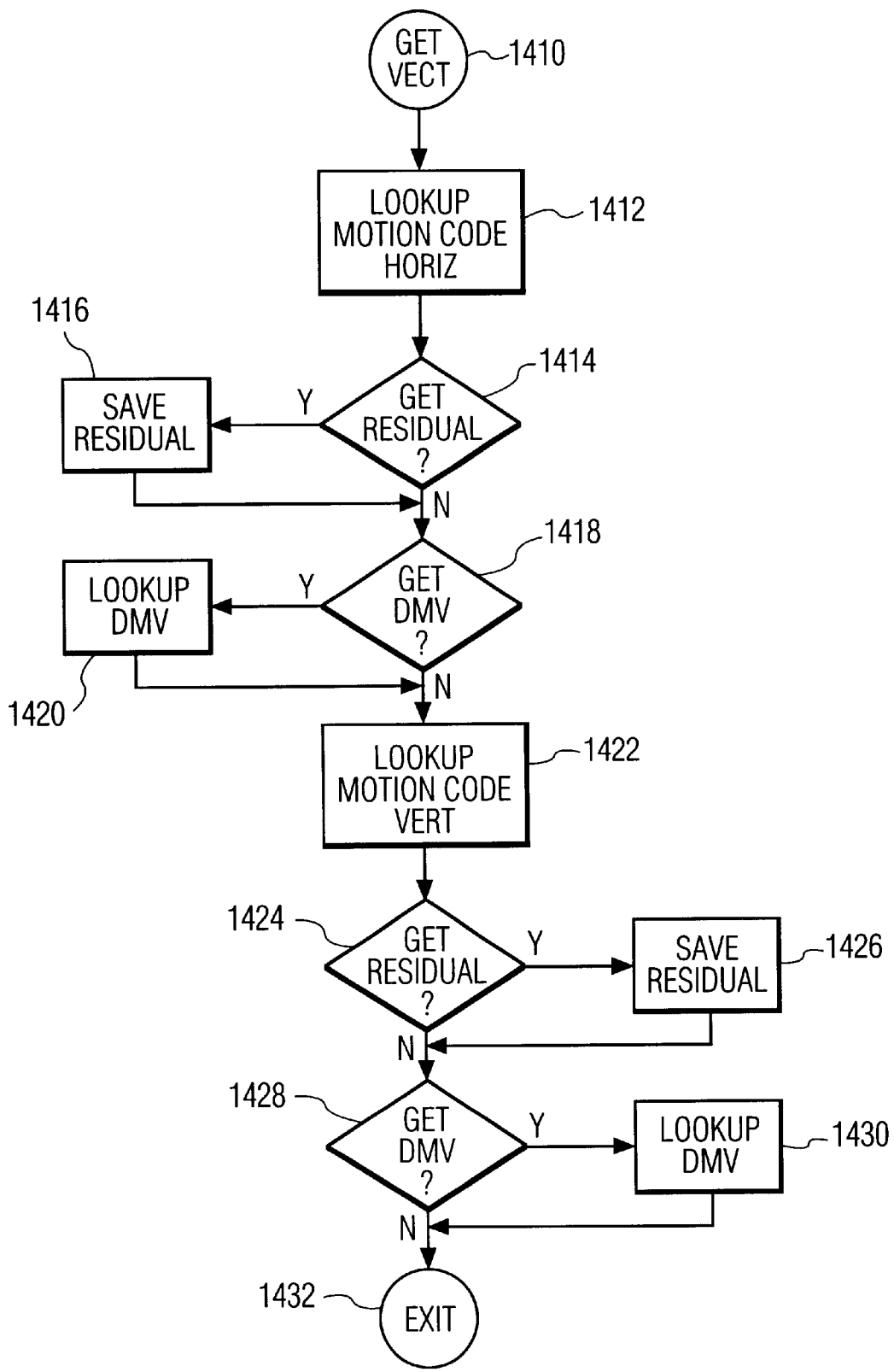
FIG. 14 is a flow-chart diagram which is useful for describing the procedure GET VECT of the flow-chart diagram shown in FIG. 13.

FIGS. 13 and 14 are flow chart diagram which describe the operation of the state machine in the Vectors state 328. At step 310, the state machine waits for the prior state to complete and fetches the current time allotted to the Vectors state from the parse rate lookup table 216. As described above with reference to FIG. 12, the Vectors state is invoked to fetch either a forward motion vector or a backward motion vector. Under the MPEG standard, a Macroblock may be designated as a predicted Macroblock having a single forward motion vector, a bidirectionally predicted Macroblock, having a forward motion vector and a backward motion vector or a dual-prime Macroblock in which case it has two forward motion vectors, one for each field, and two backward motion vectors.

At step 1312 of the Vectors process, the Macroblock header is tested to determine if the Macroblock has one set of motion vectors or two sets of motion vectors. If the Macroblock has two sets of motion vectors, control transfer to step 1314 which fetches the motion vertical field select value for the first motion vector from the Macroblock header and transfers control to step 1320. Step 1320, invokes the process GET VECT to fetch the actual motion vector information from the Macroblock header for the first motion vector of the two-vector set. This step is described below in detail with reference to FIG. 14. After step 1320, step 1322 is executed which fetches and saves the motion vertical field select value for the second motion vector. After step 1322, the process GET VECT is again invoked at step 1324 to extract the motion vector values for the second motion vector of the motion vector set from the bit-stream. If at step 1312, the process determines that the Macroblock contains only a single motion vector, then control transfers to step 1316 which determines if the single motion vector includes a motion vertical field select value. If so, then at step 1318, this information is retrieved from the motion vector header and control is transferred to step 1324 to fetch the actual vector information. After 1324, the next state for the state machine is the Macroblock Quantizer state 326. This state is reentered after the vector state 328 to ensure that no other motion vectors need to be obtained for the Macroblock. Even for a dual-prime Macroblock in a bidirectionally encoded image, only two passes through the Macroblock Quantizer state should be needed for a given Macroblock.

FIG. 14 is a flow chart diagram which illustrates the operation of the process GET VECT shown at steps 1320 and 1324 of FIG. 13. The first step in this process, step 1412, fetches the horizontal motion code from the motion vector information in the Macroblock. At step 1414, the next bit of motion vector information is fetched from the bit stream to determine if residual information exists for this motion vector. If so, then at step 1416, the residual information is retrieved from the bit-stream and saved. At steps 1418 and 1420, the next information in the bit stream is tested to determine if the motion vector is a dual-prime motion vector. Steps 1422, 1424, 1426, 1428 and 1430 repeat the process set forth above except that these steps fetch vertical motion vector information. Step 1432 is the end of the process GET VECT. After this step, the process returns to the point in the Vectors state 328 which immediately follows the invocation of GET VECT.

Figure 15:
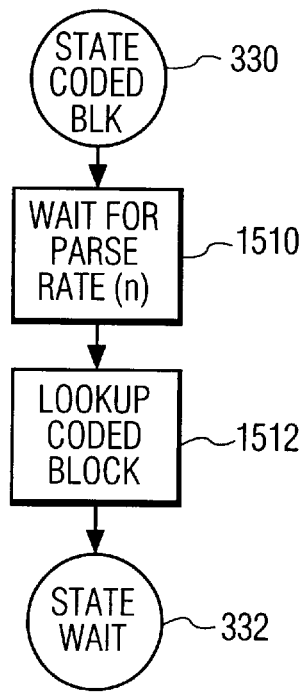
FIG. 15 is a flow-chart diagram which is useful for describing processing performed by the state machine while it is in the coded block state shown FIG. 3.

FIG. 15 is a flow chart diagram which illustrates the process performed by the Coded Block state 330 of the state machine. At step 1510, the Coded Block process waits for the previous state to complete and fetches the currently allotted time value for the Coded Block state from the parse rate lookup table 216. At step 1512, the process fetches the coded block information from the Macroblock header. Once the coded block information has been fetched at step 1512, the blocks of the Macroblock are ready to be passed to the Macroblock processor 132 and, consequently, the Wait state 332 is the next state to be entered by the state machine.

Figure 16:
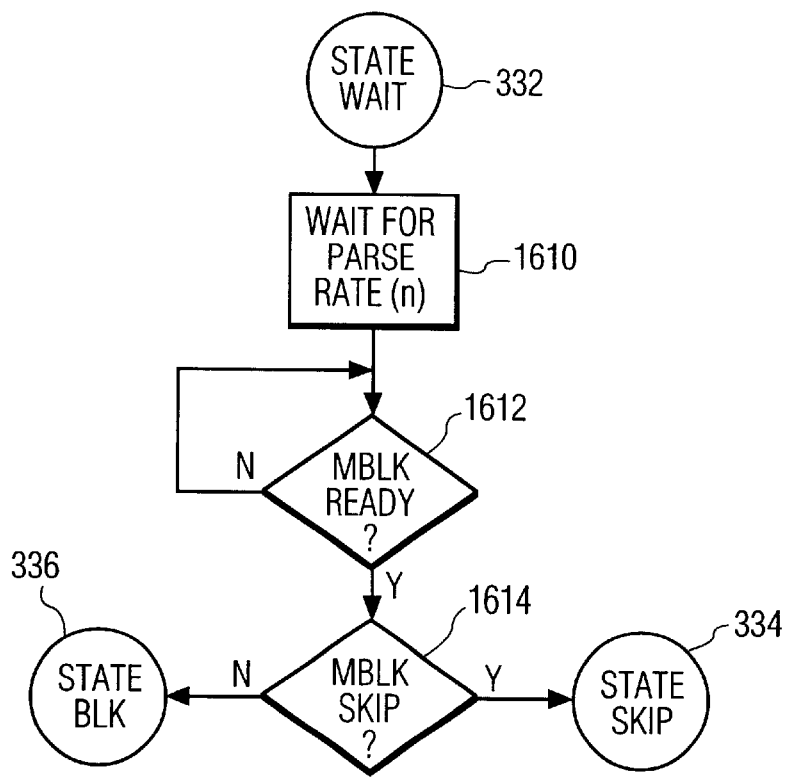
FIG. 16 is a flow-chart diagram which is useful for describing processing performed by the state machine while it is in the Wait state shown in FIG. 3.

FIG. 16 is a flowchart diagram which illustrates the operation of the Wait state 332. At step 1610, the state machine waits for the prior state to complete and fetches the currently allotted time or the Wait state from the parse rate lookup table 216. At step 1612, the wait process determines if the READY signal provided by the Macroblock decoder 132 indicates that the decoder 132 is ready to accept another Macroblock. While it is not ready, step 1612 branches to itself to continually test this signal provided by the Macroblock decoder 132.

Once the Macroblock decoder indicates that it is ready to accept Macroblocks for decoding, control is transferred to step 1614 to determine if the Macroblock is a skipped Macroblock. As described above, a Macroblock may be skipped in two instances: 1) when the Macroblock is marked as being skipped in the MPEG-2 syntax and 2) when the Macroblock decoder has encountered an error and signals the parser 212 to skip the remaining Macroblocks in the Slice record. If, at step 614, the Macroblock Skip flag is set, then the next state for the state machine is the Skip state 334. Otherwise, the next state for the state machine is the Block state 336.

Figure 17:
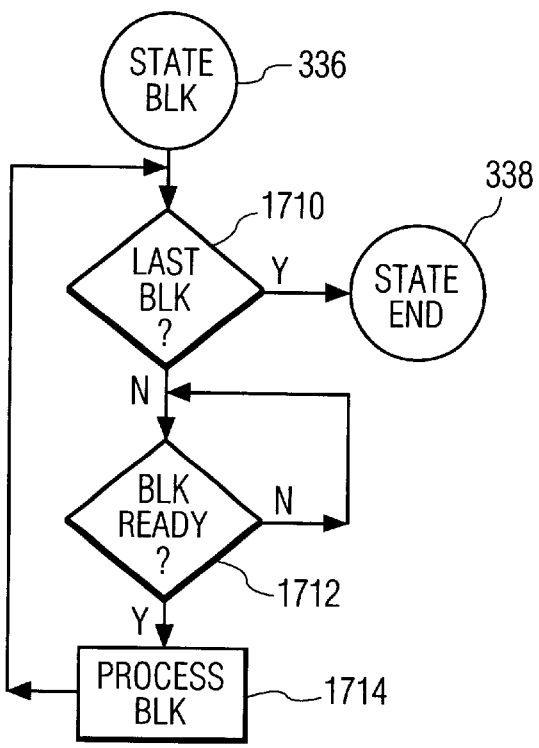
FIG. 17 is a flow-chart diagram which is useful for describing processing performed by the state machine while it is in the block state shown in FIG. 3.

FIG. 17 is a flow chart diagram which describes the operation of the Block state 336. At step 1710, the process determines if the block that was just processed was the last block in the current Macroblock. If so, the next state for the state machine is set to the End state 338. Otherwise, step 1712 is executed to determine if the Macroblock decoder 132 has asserted the READY signal. The Macroblock decoder 132 provides the READY signal when it is ready to receive a block for inverse quantization and inverse discrete cosine transform processing. When it is ready to receive the block step 1714 is executed which transfers control to the Macroblock decoder 132. After processing a block in step 1714, control transfers to step 1710 as described above. This process continues until all of the blocks in the Macroblock have been processed.

Figure 18:
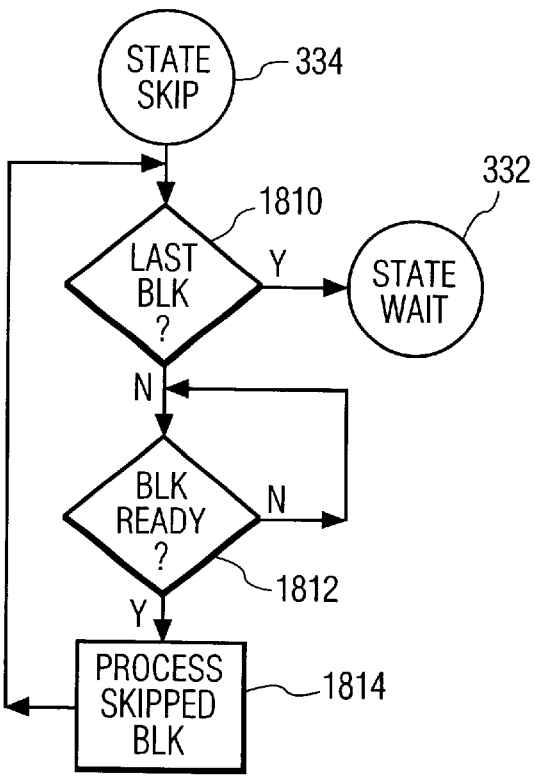
FIG. 18 is a flow-chart diagram which is useful for describing processing performed by the state machine while it is in the skip state shown in FIG. 3.

FIG. 18 is a flow chart diagram which illustrates the operation of the Skip state 334. The Skip state is essentially the same as the Block state except for the step 1814, process skipped block. This step, either 1) does nothing if the Macroblock was marked as a skipped Macroblock in the MPEG-2 syntax or 2) removes the bytes corresponding to the block to be skipped from the bit stream if the block is skipped due to an error in the Macroblock decoder. This continues until all of the blocks in the Macroblock have been processed. After the last block has been processed, step 1810 transfers control to the Wait state 332.

Figure 19:
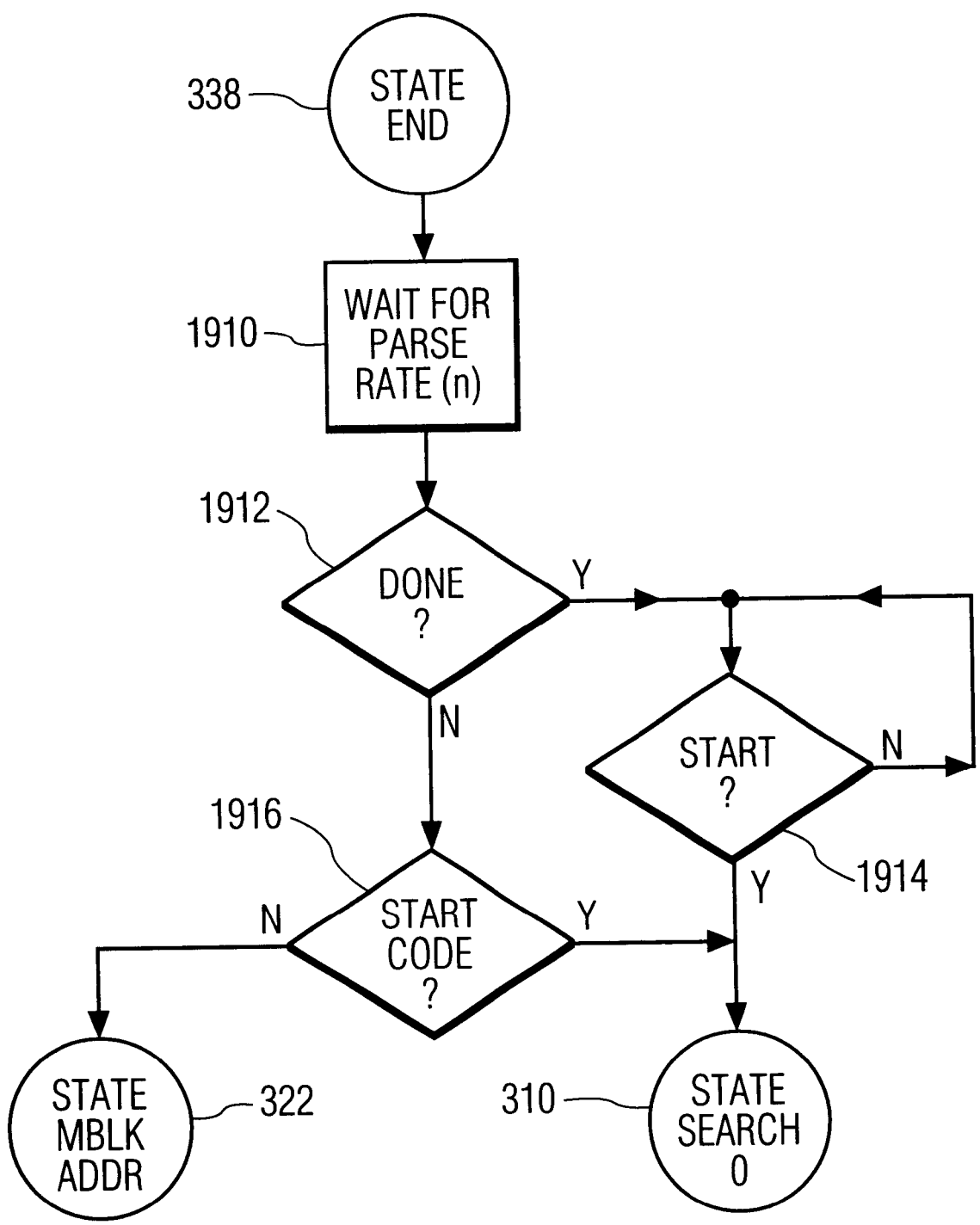
FIG. 19 is a flow-chart diagram which is useful for describing processing performed by the state machine while it is in the end state shown in FIG. 3.

FIG. 19 is a flow chart diagram which illustrates the operation of the state machine for the End state 338. At step 1910, the state machine waits for the prior state to complete and fetches the current time allotted for the End state from the parse rate lookup table 216. At state 1912, the state machine determines if processing for the current Slice is complete. If so, control transfers to step 1914 to wait until the decoder is ready to process another Slice. After step 1914, control is transferred to the Search0 state 310 to begin searching for the start code of the next Slice record as described above with reference to FIG. 4.

If, at step 1912, there are more Macroblocks to be processed in this Slice, then step 1916 is executed to determine if the next bytes in the bit stream correspond to a start code. If not, then there is at least one more Macroblock in the Slice and the next state in the state machine is set to the Macroblock Address state 322, described above with reference to FIG. 10. If, at step 1916 the next bytes in the bit stream do correspond to a start code, then the last Macroblock in the Slice has been processed and the Search0 state 310 is set as the next state for the state machine.

Figure 20:
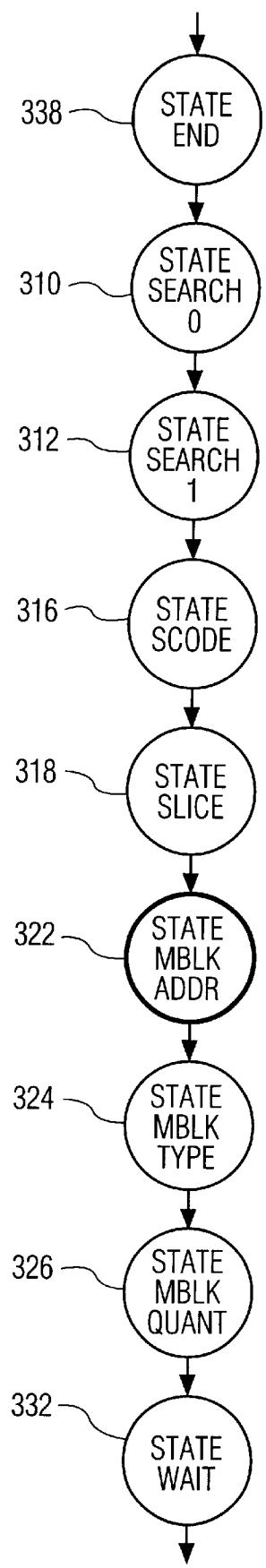
FIGS. 20, 21 and 22 are exemplary state transitions performed by the state machine shown in FIG. 3 in decoding an intra-frame encoded Macroblock, a predictively encoded Macroblock and a bidirectionally predictively encoded Macroblock, respectively.
Figure 21:
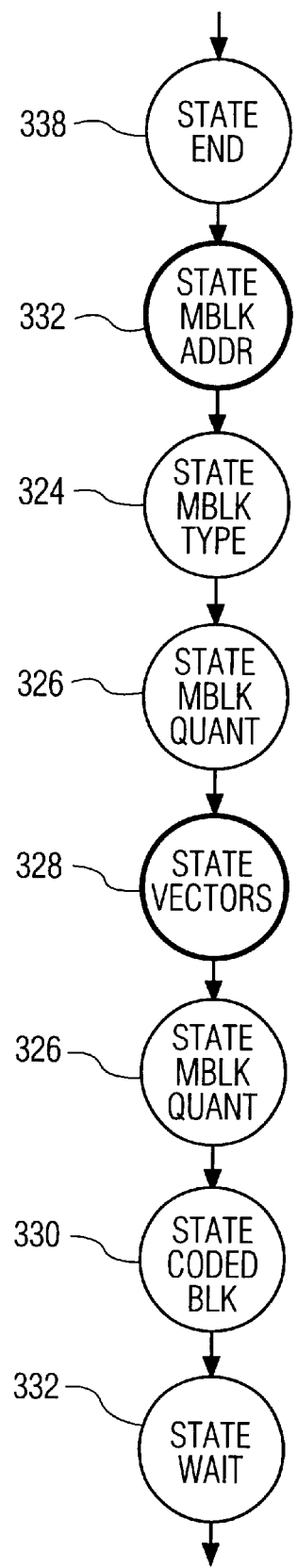
Figure 22:
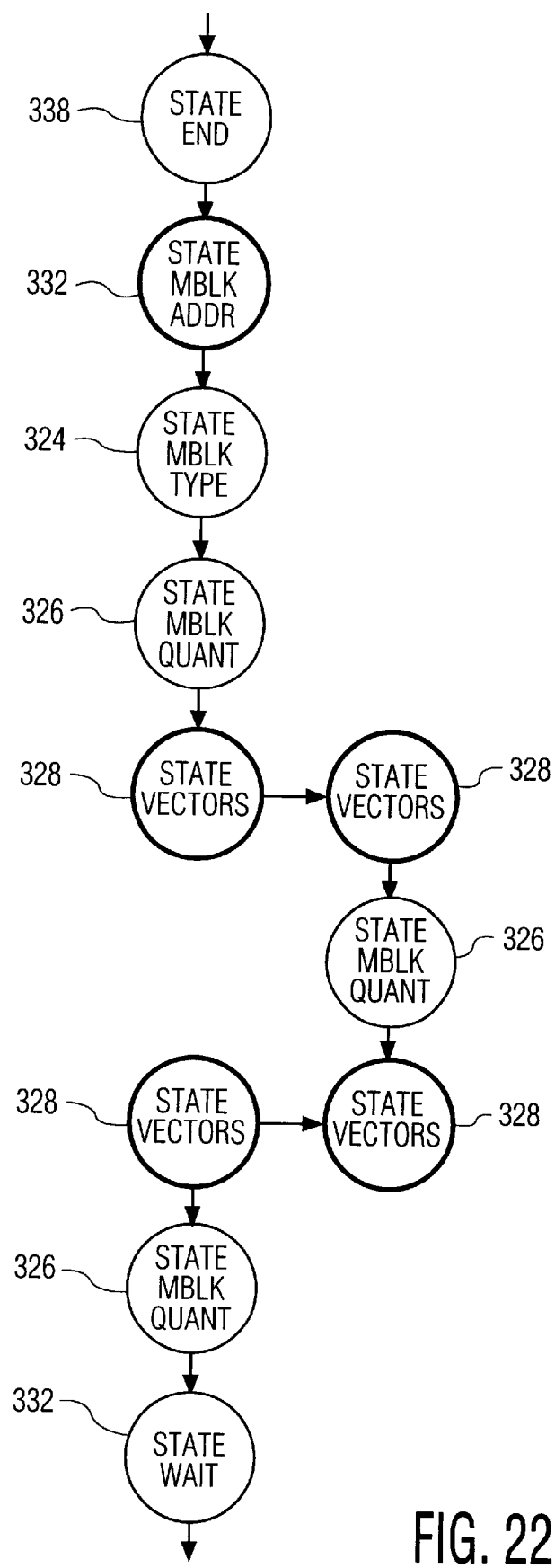

FIGS. 20, 21, and 22 illustrate applications of the state machine of the subject invention. Each of these figures shows a sequence of states which is used to decode a Macroblock. FIG. 20 shows the exemplary parsing of an intra-frame or intra-field coded Macroblock which is the first Macroblock in its Slice. Starting at the End state 338, the state machine transitions to the Search0 state 310, then to the Search1 state 312 and then to the Start Code state 316. At this point in its processing, the state machine has encountered a start code in the bit stream. Also at state 316, the start code is determined to be a Slice start code causing the next state of the state machine to be the Slice state 318, in which the Slice header information is decoded.

Each of the states 338, 310, 312, 316, and 318 require a relatively small amount of processing. Accordingly, each of these states may be completed in one state cycle time. The next state in the process, however, state Macroblock Address 322 requires more processing time than any of the previous states shown in FIG. 20. In the parse rate lookup table 216, this state is allotted twice the state processing time of any of the previous states. This is indicated in the drawing figures by the thick border of state 322. Following the Macroblock Address state 322, the state machine transition to states Macroblock Type 324, Macroblock Quantizer 326 and then to the Wait state 332 to wait for the Macroblock decoder 132 to accept the blocks of the intracoded Macroblock.

FIG. 21 shows the operation of the state machine in decoding a predictively encoded Macroblock (P-frame or P-field) which is not the first Macroblock in the Slice. FIG. 21 begins with the End state 338 followed by the Macroblock Address state 332, as in FIG. 20, the End state is allowed one state time while state Macroblock Address 332 is allowed two state times. After state 322, the state machine transitions to the Macroblock Type state 324 and the Macroblock Quantizer state 326. After state 326, the state machine transitions to the Vectors state 328. As the processing in the Vectors state is also more extensive than in other states, two state processing times are allocated to the Vectors state 328. As described above with reference to FIGS. 12 and 13, after processing the Vectors state, the state machine again returns to the Macroblock Quantizer state to ensure that no other motion vectors need to be obtained. As this is a predictively encoded Macroblock, the bit-stream contains only one motion vector. After the Macroblock Quantizer state 326, the state machine transitions to the Coded Block state 330 and then to the Wait state 332.

FIG. 22 illustrates the operation of the state machine when processing a bidirectionally encoded Macroblock which is also a dual-prime Macroblock. As described above, this Macroblock has four sets of motion vectors. The first five states of the state machine shown in FIG. 22 are the same as in FIG. 21. After the first motion vectors have been obtained, however, the Vectors state is invoked a second time to obtain the second set of forward motion vectors for the dual-prime Macroblock as described above with reference to FIG. 13. Following the second invocation of the Vectors state, the state machines transitions to the Macroblock Quantizer state 326 and then again to the Vectors state 328 to obtain the first backward motion vector. As this is a dual-prime motion vector the Vectors state is invoked again to obtain the second backward motion vector. Following the second invocation of the Vectors state, the Macroblock Quantizer state 326 is again invoked followed by the Wait state 332.

If a number of clock cycles, n, is assigned to each state time for the state machine shown in FIG. 3, then the syntax processing for the intracoded Macroblock in FIG. 20 spans 10 state times while the processing for the predictively encoded Macroblock in FIG. 21 spans 10 state times and the processing for the bidirectionally encoded Macroblock shown in FIG. 22 spans 16 state times.

In a conventional variable length decoder, the time allocated the syntax processing of all Macroblocks in the bit-stream would need to conform to the worst case processing (i.e. that shown in FIG. 22). By adaptively allocating processing time to the various states, however, a decoder according to the present invention can achieve significant time savings in the syntax processing of Slices and Macroblocks. This time savings may allow a slower syntax processor to operate with a relatively fast Macroblock decoder. In addition, because the state delays may be increased, an otherwise vast syntax processor may be slowed down by simply increasing its state delays so that it is compatible with a slower Macroblock decoder. Thus, a given integrated circuit (IC) implementation of the variable rate parser 212 and Macroblock decoder 132, may be scaled up or scaled down and any timing variations in the resulting ICs may be compensated by adjusting the state timing of the parser 212.

While this invention has been described in terms of a Macroblock syntax processor for an MPEG-2 decoder, it is contemplated that it may be practiced with any state machine that processes an input signal to extract information which is processed by another processor. In this manner the pre-processor may be made compatible with a wide variety of other processing hardware.

While the invention has been described in terms of an exemplary embodiment, it is contemplated that it may be practiced as outlined above within the scope of the appended claims.

What is claimed:

1. Apparatus for processing a digitally encoded signal conforming to a predetermined protocol, the protocol defining multiple record types, each record type including header information and payload data, the apparatus comprising:

a state machine which parses the header information in at least selected ones of the multiple record types, wherein the state machine defines states which perform discrete parsing operations and transitions between states are determined by parsing the digitally encoded signal;

means for defining respective processing times for a plurality of the state types including respective state times for a first state and a second state;

processing means for performing processing steps indicated by the first state; and delay means for waiting until the respective defined processing time for the first state has elapsed to transition to the second state.

2. Apparatus according to claim 1, further including, means for adaptively specifying the respective processing times for each of the state types, wherein the processing time for each state changes responsive to the payload data of the records.

3. Apparatus according to claim 1 further including, means for adaptively specifying the respective processing times for each of the state types, wherein the processing time for each state changes responsive to changes in other processing elements which are coupled to the state machine.

4. Apparatus for processing an MPEG-2 encoded signal, having Slice level records, each Slice level record having header information and a plurality of Macroblock level records, each Macroblock level record having header information and a plurality of blocks of frequency-domain coefficient values, the apparatus comprising:

a state machine including a first state which parses the header information the Slice level records and a second state which parses the header information in the Macroblock level records to extract the plurality of blocks of frequency-domain coefficient values from the MPEG-2 encoded signal, the state machine comprising:

means for defining respective processing times for the first and second states;

processing means for performing processing steps indicated by the first state;

delay means for waiting until the respective defined processing time for the first state has elapsed to transition to the second state; and processing means for performing processing steps indicated by the second state to the header information in the plurality of Macroblocks to extract the blocks of frequency domain coefficient values from the plurality of Macroblocks; and Macroblock decoding means for transforming the extracted blocks of frequency domain coefficient values into spatial domain pixel values.

5. Apparatus according to claim 4 wherein the plurality of Macroblocks includes predictively encoded Macroblocks and bidirectionally predictively encoded Macroblocks, the Macroblock headers of the predictively encoded Macroblocks including a single motion vector and the bidirectionally predictively encoded Macroblocks including multiple motion vectors, the apparatus further including, means for adaptively specifying the respective processing times for each of the first and second states, wherein the processing time for the second state changes responsive to the processing of a predictively encoded Macroblock and a bidirectionally predictively encoded Macroblock.

6. Apparatus according to claim 5, wherein a predetermined amount of time is allocated for decoding a single image of the MPEG-2 data signal and the means for adaptively specifying the respective processing times for each of the first and second states specifies respective first and second portions of the predetermined amount of time as the respective processing times for the first and second states.

7. Apparatus according to claim 4, further including means for adaptively specifying the respective processing times for each of the state types, wherein the processing time for each state changes responsive to changes in the Macroblock decoding means.

8. A method of processing a digitally encoded signal conforming to a predetermined protocol, the protocol defining multiple record types, each record type including header information and payload data, the method comprising:
  parsing the header information in at least selected ones of the multiple record types, by performing a discrete parsing operation in respective states of a state machine and transitioning between states as the digitally encoded signal is parsed;
  defining respective processing times for a plurality of the states including respective state times for first one of the states and a for a second one of the states;
  performing processing steps indicated by the first state; and
  waiting until the respective defined processing time for the first state has elapsed to transition to the second state.

9. A method according to claim 8, further including, the step of adaptively specifying the respective processing times for each of the state types, wherein the processing time for each state changes responsive to the payload data of the records.

10. A method according to claim 8 further including, the step of adaptively specifying the respective processing times for each of the state types, wherein the processing time for each state changes responsive to changes in processes performed on the records outside of the state machine.

11. A method of processing an MPEG-2 encoded signal, having Slice level records, each Slice level record having header information and a plurality of Macroblock level records, each Macroblock level record having header information and a plurality of blocks of frequency-domain coefficient values, the method comprising the steps of:
  parsing the header information of the Slice records in a first state and parsing the header information of the Macroblock a first state which parses the header information the Slice level records and a second state which parses the header information in the Macroblock records in a second state to extract the plurality of blocks of frequency-domain coefficient values from the MPEG-2 encoded signal, including the steps of
    defining respective processing times for the first and second states;
    processing the Slice header information in the first state;
    waiting until the respective defined processing time for the first state has elapsed to transition to the second state; and
    Processing the Macroblock header information in the second state to extract the blocks of frequency domain coefficient values from the plurality of Macroblocks; and
  transforming the extracted blocks of frequency domain coefficient values into spatial domain pixel values.

12. A method according to claim 11 wherein the plurality of Macroblocks includes predictively encoded Macroblocks and bidirectionally predictively encoded Macroblocks, the Macroblock headers of the predictively encoded Macroblocks including a single motion vector and the bidirectionally predictively encoded Macroblocks including multiple motion vectors, the method further includes the step of, adaptively specifying the respective processing times for each of the first and second states, wherein the processing time for the second state changes responsive to the processing of a predictively encoded Macroblock and a bidirectionally predictively encoded Macroblock.

13. A method according to claim 12, wherein a predetermined amount of time is allocated for decoding a single image of the MPEG-2 data signal and the step of adaptively specifying the respective processing times for each of the first and second states specifies respective first and second portions of the predetermined amount of time as the respective processing times for the first and second states.

14. A method according to claim 11, further including the step of adaptively specifying the respective processing times for each of the state types, wherein the processing time for each state changes responsive to changes in the Macroblock decoding means.

* * * * *